United States Patent

Lenane

[15] 3,688,476
[45] Sept. 5, 1972

[54] EXHAUST SYSTEM

[72] Inventor: Denis L. Lenane, Ferndale, Mich. 48220

[73] Assignee: Ethyl Corporation, New York, N.Y.

[22] Filed: Nov. 24, 1969

[21] Appl. No.: 879,043

[52] U.S. Cl. .................... 55/276, 55/337, 55/349, 55/459, 55/DIG. 30, 60/311, 181/58, 181/66
[51] Int. Cl. ............................................. B01d 45/12
[58] Field of Search......... 55/276, DIG. 30, 337, 349, 55/459, 460; 181/66, 67, 58; 60/29, 311

[56] References Cited

UNITED STATES PATENTS

| | | | |
|---|---|---|---|
| 1,681,255 | 8/1928 | Quarmby | 181/66 |
| 2,418,061 | 3/1947 | Weinberger | 55/459 |
| 3,056,662 | 10/1962 | Ridgway | 55/DIG. 30 |
| 3,400,784 | 9/1968 | Thrasher | 181/50 |
| 3,485,593 | 12/1969 | Lenane et al. | 55/DIG. 30 |
| 3,397,034 | 8/1968 | Tulleners et al. | 55/DIG. 30 |
| 3,421,315 | 1/1969 | Aoi | 55/DIG. 30 |
| 3,564,843 | 2/1971 | Hirschler, Jr. et al. | 55/337 |
| 3,426,513 | 2/1969 | Bauer | 55/DIG. 30 |
| 3,545,179 | 12/1970 | Nelson et al. | 55/276 |

Primary Examiner—Bernard Nozick
Attorney—Donald L. Johnson

[57] ABSTRACT

Particulates are removed from a particulate-laden gas stream such as the exhaust gas from an internal combustion engine by passing the gas through a cyclone type inertial separator. The separator has particulate reject slots cut in the side wall of the cyclone chamber through which particulates are rejected into a collection chamber. The collection chamber can be filled with a porous material such as wire mesh. The bottom of the cyclone chamber is a solid plate. The separator can be built into a conventional muffler.

19 Claims, 9 Drawing Figures

PATENTED SEP 5 1972

INVENTOR.

Denis L. Sprane

EXHAUST SYSTEM

BACKGROUND

The removal of dust or particulates from a gas has been practiced for many years in many diverse areas. It can be used to reduce explosion hazards in such operations as flour milling or can be used to remove particulates from smoke resulting from the burning of coal or other fuels. More recently, efforts have been made to remove particulates or finely divided solids from the exhaust gas of internal combustion engines. These particles are formed during the combustion of the fuel and contain carbonaceous material and other combustion products of additives conventionally used in such fuels. In the past, cyclone type inertial separators have been employed in this use, as shown by U.S. Pats. Nos. 3,056,662; 3,132,473; 3,154,389; 3,162,518; 3,197,955 and 3,253,400. The devices shown in these patents all have provisions for collected solids to enter the collection chamber through a reject hole in the bottom plate or closure of the cyclone chamber. This is the area where the exhaust gas vortex reverses direction and starts spiraling up inside the outer vortex to enter the exit tube. Because of this, there is more turbulence in the area of the bottom plate of the cyclone which can cause re-entrainment of collected solids, especially under pulsating operating conditions as encountered in the exhaust system of an internal combustion engine.

SUMMARY

It has now been found that collection efficiency of a cyclone type inertial particulate separator can be greatly improved by use of a cyclone separator which is provided with particulate reject holes in the side wall of the cyclone chamber rather than in the bottom plate. In this cyclone collector the bottom is a solid plate upon which the gas vortex reverses direction without causing re-entrainment of solids. Effectiveness is increased further by filling the collection chamber with a porous material such as wire mesh whereby the particulate gathers in the interstitial spaces.

DESCRIPTION OF THE PREFERRED EMBODIMENTS

Figure 1:
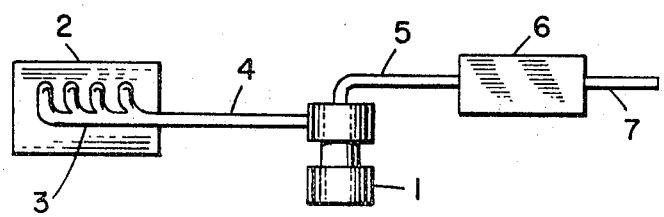
FIG. 1 is a schematic showing an internal combustion engine and its exhaust system, comprising an exhaust pipe, a cyclone type particulate separator and a catalytic muffler.

Referring to the drawings, FIG. 1 shows an embodiment of the invention in which a solid-bottomed, side-slotted,cyclone particulate separator 1 is used in an exhaust system for an internal combustion engine. The system comprises the engine 2 having an exhaust manifold 3 which connects with exhaust pipe 4, leading to the inlet port of separator 1. After the particulates are removed in the separator, the cleaned exhaust gas passes through pipe 5 leading to the conventional catalytic muffler 6, wherein the carbon monoxide and hydrocarbon content of the exhaust gas is oxidized. The purified gas is then passed to the atmosphere through tail pipe 7.

Figure 2:
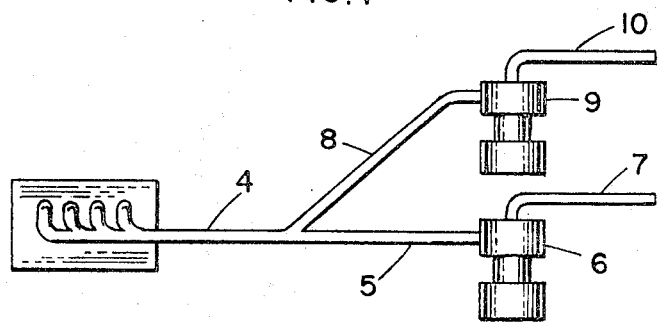
FIG. 2 is another schematic of an exhaust system showing dual particulate separators.

In FIG. 2 a similar arrangement is shown except dual separators are used. The majority of the exhaust gas coming through exhaust pipe 4 passes through primary conduit 5 into primary separator 6 wherein particulates are removed and the cleaned exhaust gas exhausted at tail pipe 7. Exhaust pipe 4 and primary conduit 5 form a substantially straight path of least resistance through the area where secondary conduit 8 diverges forming an exhaust flow path to secondary cyclone 9, which handles excess exhaust. This cleaned exhaust is likewise exhausted through tail pipe 10.

Figure 3:
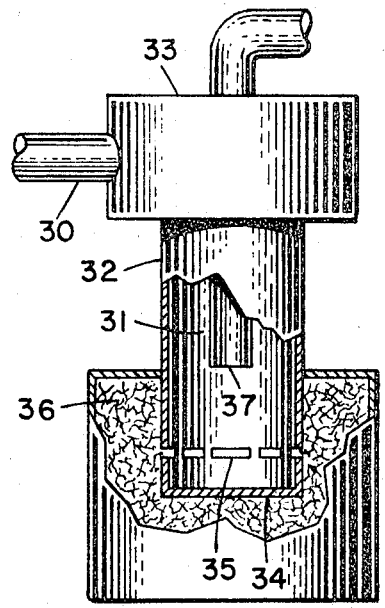
FIG. 3 is a partially cut-away drawing of the cyclone type particulate separator showing a cyclone chamber with an exit tube extending therein and reject slots in the side wall of the cyclone chamber forming a passageway into a collection chamber containing wire mesh.

Referring now in more detail to the novel cyclone separator, it is seen in FIG. 3 that the separator comprises an entry port 30 located at the top part of cyclone chamber 31, which is defined by a substantially radially symmetrical side wall 32 and end closures 33 and 34. Closure 34 is a solid plate. The cyclone chamber employs one of several well-known conventional means for inducing cyclonic circulation such as deflecting vanes or tangential entry. At the end opposite the entry port, reject slots or holes 35 are cut in side wall 32 through which cyclone chamber 31 communicates with collection chamber 36. Extending down the axis of cyclone chamber 31 is exit tube 37, which extends through end closure 33. Collection chamber 36 can be filled with a porous material. This can be any material which has a solid phase with many interstitial spaces. Examples of these are wire mesh, steel wool, metal turnings, nails, expanded metal, wire screen, glass wool, asbestos fiber, marble chips, granular alumina, granular silica, and the like. Preferred porous materials are expanded metal and wire mesh.

The size relationship of the cyclone separator depends upon the gas volume and particulate size and can readily be determined by well known methods. In removing particulates from the exhaust gas from an automotive engine, good results are obtained using a cyclone chamber about 2–3 inches in diameter and 6–12 inches long with an exit tube 1–2 inches in diameter.

In operation, gas containing particulates enters cyclone chamber 31 at entry port 30 and is induced into cyclonic rotation by conventional means. It spirals down cyclone chamber 31 throwing particulate material against side wall 32. When the particulates reach reject slots 35 they are rejected into collection chamber 36. Means can be provided for periodically removing collected particulates from collection chamber 36, such as a removable cover. The spiraling gas vortex reaches solid end closure 34 and reverses direction spiraling up and passing into exit tube 37, which conducts the cleaned exhaust gas through end closure 33. Exit tube 37 can be adapted to engage another conduit to carry the clean gas to a more remote location or to another unit for further treatment such as to a conventional catalytic muffler.

Figure 4:
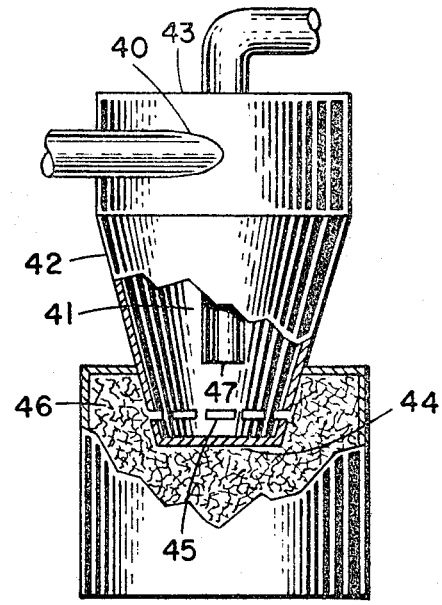
FIG. 4 is a partially cut-away drawing of another type cyclone separator similar to FIG. 3 except having the exhaust gas entry port tangential to the cyclone chamber and an inverted truncated cone-shaped cyclone chamber having reject slots in the side wall.

FIG. 4 is an embodiment similar to FIG. 3 in which entry port 40 injects particulate containing gas tangentially into cyclone chamber 41 defined by substantially radially symmetrical side wall 42 and end closures 43 and 44. In side wall 42 are reject slots 45 communicating with collection chamber 46. Exit tube 47 extends axially into chamber 41 through end closure 43.

This inverted truncated cone-shaped unit functions in the same manner as the unit shown in FIG. 3. Particulate containing gas enters chamber 41 tangentially at entry port 40 and swirls down throwing particulates against side wall 42. The solids migrate down and are thrown out reject holes 45 into collection chamber 46. This chamber is preferably filled with a porous material such that the collected particulates are retained in the interstitial spaces.

Figure 5:
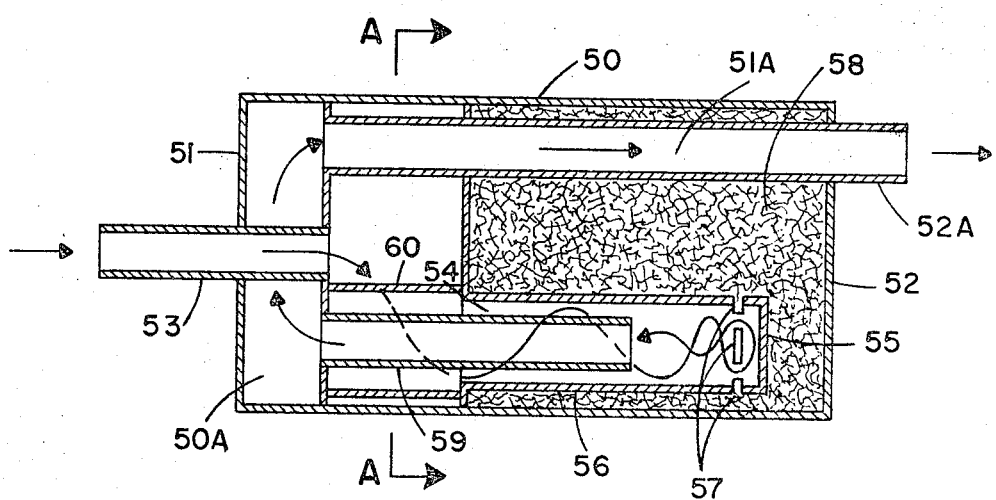
FIG. 5 is a longitudinal cross-section of a muffler containing a solid-bottomed, side-slotted, cyclone separator. The arrows show the exhaust gas path through the muffler.
Figure 6:
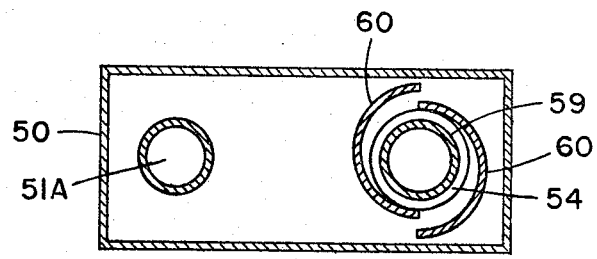
FIG. 6 is a cross-section of the same muffler shown in FIG. 5 taken at AA. It shows deflector vanes which are means of inducing cyclonic flow.

FIG. 5 shows an embodiment of the particulate removal device in which the cyclone separator is disposed within a muffler suitable for use in an automotive exhaust system. The muffler is defined by side walls 50 and end closures 51 and 52. Inlet 53 forms a flow path through end closure 51 to substantially radially symmetrical cyclone chamber 54. At the entry end of cyclone chamber 54 are deflector vanes 60. At the other end of cyclone chamber 54 is solid bottom plate 55. In side wall 56 of chamber 54 are reject slots 57 cut in the area adjacent bottom plate 55. Chamber 54 communicates through reject slots 57 with collection chamber 58 which contains compacted expanded metal. Exit tube 59 extends axially into chamber 54 and communicates with compartment 50A, which in turn communicates with exhaust tube 51A to muffler outlet 52A.

In operation, muffler inlet 53 is connected to the exhaust pipe of an internal combustion engine such that the exhaust pipe carries particulate containing gas from the exhaust manifold of the engine to muffler inlet 53. The gas passes through end closure 51 and then past deflector vanes 60 into cyclone chamber 54 in a spiraling motion. Particulates in the gas are thrown against side wall 56 and subsequently rejected through slots 57 into collection chamber 58. The exhaust gas reverses direction on bottom plate 55 and enters exit tub 59. It then passes into compartment 50A and then exhaust tube 51A, which takes it through end closure 52 to muffler outlet 52A. Muffler outlet 52A is adapted to engage a tail pipe or other conduit for conducting the cleaned exhaust gas to a more remote location where it can be exhausted to the atmosphere or treated further, for example, by passing it through a conventional catalytic muffler.

Figure 7:
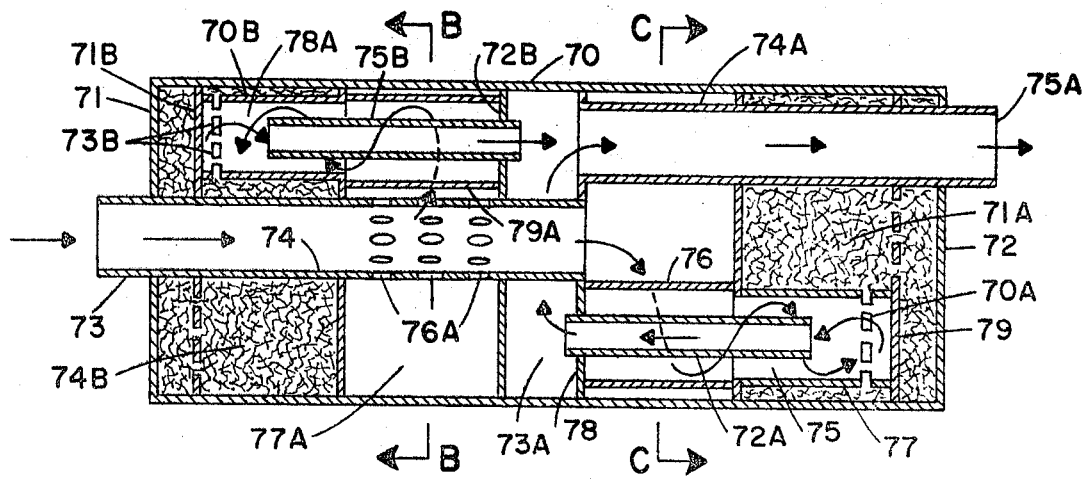
FIG. 7 is a longitudinal cross-section of a muffler containing dual solid-bottomed, side-slotted, cyclone separators. It shows a perforated primary conduit. Both primary and secondary exhaust paths are shown by arrows.
Figure 8:
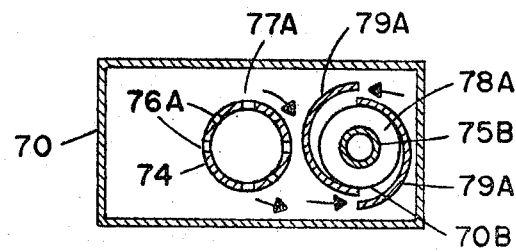
FIG. 8 is a cross-section of the same muffler shown in FIG. 7 taken at BB, showing the perforated primary conduit, the secondary cyclone separator and the flow path from the primary conduit through the perforations to the secondary cyclone.
Figure 9:
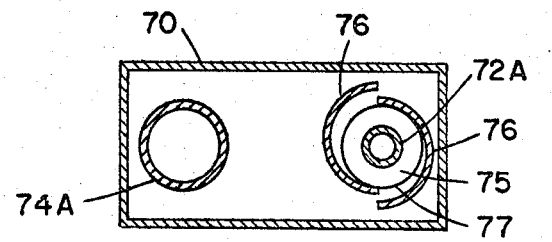
FIG. 9 is a cross-section of the muffler shown in FIG. 7 taken at CC, showing the deflecting vanes of the primary cyclone separator and the exhaust tube leading to the atmosphere.

FIG. 7 shows an embodiment of the invention in which a muffler is constructed to contain dual solid bottom cyclone separators. This device comprises a muffler body formed by side walls 70 and end closures 71 and 72. Exhaust inlet 73 is adapted to engage the exhaust pipe of an internal combustion engine. Inlet 73 communicates through primary exhaust conduit 74 with cyclone chamber 75. At the entry end of chamber 75 are deflector vanes 76 which function to induce cyclonic flow. Chamber 75 is formed by substantially radially symmetrical side wall 77 and end closures 78 and 79. Reject slots 70A are cut in side wall 77 in the area of end closure 79. Chamber 75 communicates through reject slots 70A with collection chamber 71A. Exit tube 72A extends into cyclone chamber 75 and communicates through end closure 78 with plenum chamber 73A, which forms a flow path through exhaust tube 74A to exhaust outlet 75A. Primary conduit 74 contains perforations 76A which communicate with secondary conduit 77A. Secondary conduit 77A forms a flow path into secondary substantially radially symmetrical cyclone chamber 78A, past deflector vanes 79A. Secondary chamber 78A is formed by side wall 70B and end closures 71B and 72B. Cut in side wall 70B are reject slots 73B, which communicate with collection chamber 74B. Extending into secondary chamber 78A is exit tube 75B forming a passage through end closure 72B to plenum chamber 73A, which, as stated previously, communicates through exhaust tube 74A to exhaust outlet 75A.

In operation, exhaust gas containing particulates is conducted from the exhaust manifold of the engine through an exhaust pipe to muffler inlet 73. This gas is conducted through primary conduit 74 to cyclone chamber 75. In entering cyclone chamber 75, the exhaust gas is induced into cyclonic flow by deflector vanes 76. The particulates are thrown against side wall 77 and, finally, are rejected through reject slots 70A into collection chamber 71A. The exhaust gas reverses direction and spirals up through exit tube 72A into plenum chamber 73A and then passes out through exhaust tub 74A, and finally leaves the muffler at muffler outlet 75A.

A portion of the particulate-laden exhaust gas entering the muffler at inlet 73 and passing through primary conduit 74 excapes conduit 74 through perforations 76A. As the amount of exhaust volume increases, the increased pressure in primary conduit 74 causes an increased amount of the exhaust to pass through perforations 76A into secondary exhaust conduit 77A. This gas then enters secondary cyclone chamber 78A after being induced into cyclonic flow by deflector vanes 79A. The particulates are impinged against substantially radially symmetrical side wall 70B, and finally exit cyclone chamber 78A through reject slot 73B into collection chamber 74B. The cleaned exhaust gas reverses direction at solid end closure 71B and spirals back up through exit tube 75B into plenum chamber 73A. From here, the cleaned exhaust gas together with the cleaned exhaust gas from the primary cyclone separator leaves the muffler through exhaust tube 74A.

As mentioned previously, the cleaned exhaust gas, after passing through the cyclone separator of the present invention, can be further processed using a conventional catalytic muffler. In such mufflers a catalyst bed is provided and the exhaust gas passes through the catalyst bed wherein the unburned carbon monoxide and hydrocarbon substituents of the exhaust gas are oxidized. Frequently, supplemental air is mixed with the exhaust gas prior to passing through the catalytic muffler. This can be accomplished with an air pump or a venturi device. Sometimes the supplemental air is added in the exhaust manifold in order to take advantage of the extremely high temperatures therein and effect further oxidation of the gas. Suitable catalysts for use in the catalytic muffler include metallic elements, their salts and oxides, such as copper, iron, manganese, nickel, platinum, palladium, vanadium, chromium, and the like. The catalytic metals, oxides or salts are generally impregnated on a carrier material such as alumina, silica, silica-alumina, kaolin, and the like. Some especially preferred catalysts are alumina impregnated with copper oxide and palladium, alumina impregnated with copper oxide, chromia and vanadia, and alumina impregnated with copper oxide, chromia and palladium.

It has been found that the cyclone type inertial separators described herein have much higher efficiencies in removing finely divided particulates from exhaust gas than similar devices known in the prior art. The foregoing constitutes a full disclosure of the features of the present invention and the manner in which it is used. It should be understood that variations of this invention which accomplish the same result with equivalent means are also embodied within the scope of the following claims.

I CLAIM:

1. An exhaust system for an internal combustion engine comprising
   A. an exhaust pipe,
   B. a muffler comprising a muffler body having a muffler inlet operatively connected to said exhaust pipe and a muffler outlet,
   C. a cyclone separator positioned within said muffler body,
   D. means for conducting exhaust gas within said muffler from said muffler inlet into said cyclone separator, and
   E. means for conducting purified exhaust gas within said muffler from said cyclone separator out through said muffler outlet,
   said cyclone separator comprising a cyclone housing formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross section having throughout its length an inside diameter greater than the inside diameter of said exit tube and having an opening in said side wall in proximity to said non-perforate end closure, said opening connecting with a closed particulate collection chamber.

2. An exhaust system of claim 1 wherein said particulate collection chamber contains expanded metal.

3. An exhaust system of claim 1 wherein said means for inducing cyclonic circulation comprises a deflecting vane spirally disposed about the axis of said cyclone housing and located at the end of said housing opposite said non-perforate end closure, and wherein said entry port to said cyclone housing is the opening between the outer portion of said spirally disposed deflecting vane and an inner portion of a spirally disposed deflecting vane.

4. An exhaust system of claim 3 wherein said means for inducing cyclonic circulation comprises dual opposed deflecting vanes spirally disposed about the axis of said cyclone housing and located at the end of said housing opposite said non-perforate end closure, and wherein said entry port to said cyclone housing is the opening between the outer portion of one of said spirally disposed deflecting vanes and an inner portion of the other spirally disposed deflecting vane.

5. An exhaust system for an internal combustion engine comprising
   A. an exhaust pipe,
   B. a muffler comprising a muffler body having a muffler inlet operatively connected to said exhaust pipe and a muffler outlet,
   C. a primary cyclone separator and a secondary cyclone separator positioned within said muffler body,
   D. means for conducting exhaust gas within said muffler from said muffler inlet into said primary and said secondary cyclone separators, and
   E. means for conducting purified exhaust gas within said muffler from said primary and said secondary cyclone separators out through said muffler outlet,
   each of said primary and said secondary cyclone separators comprising a cyclone housing formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross section having throughout its length an inside diameter greater than the inside diameter of said exit tube and having an opening in said side wall in proximity to said non-perforate end closure, said opening connecting with a closed particulate collection chamber.

6. An exhaust system of claim 5 wherein said particulate collection chamber contains expanded metal.

7. An exhaust system of claim 5 wherein said means for inducing cyclonic circulation comprises a deflecting vane spirally disposed about the axis of said cyclone housing and located at the end of said housing opposite said non-perforate end closure, and wherein said entry port to said cyclone housing is the opening between the outer portion of said spirally disposed deflecting vane and an inner portion of a spirally disposed deflecting vane.

8. An exhaust system of claim 7 wherein said means for inducing cyclonic circulation comprises dual opposed deflecting vanes spirally disposed about the axis of said cyclone housing and located at the end of said housing opposite said non-perforate end closure, and wherein said entry port to said cyclone housing is the opening between the outer portion of one of said spirally disposed deflecting vanes and an inner portion of the other spirally dispose deflecting vane.

9. A muffler adapted for use in the exhaust system of an internal combustion engine, said muffler comprising
A. a muffler body having a muffler inlet and a muffler outlet,
B. a cyclone separator positioned within said muffler body,
C. means for conducting exhaust gas within said muffler from said muffler inlet into said cyclone separator, and
D. means for conducting purified exhaust gas within said muffler from said cyclone separator out through said muffler outlet,
said cyclone separator comprising a cyclone housing formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross section having throughout its length an inside diameter greater than the inside diameter of said exit tube and having an opening in said side wall in proximity to said non-perforate end closure, said opening connecting with a closed particulate collection chamber.

10. A muffler of claim 9 wherein said particulate collection chamber contains expanded metal.

11. A muffler of claim 9 wherein said cyclone housing is substantially cylindrical.

12. A muffler of claim 9 wherein said means for inducing cyclonic circulation comprises a deflecting vane spirally disposed about the axis of said cyclone housing and located at the end of said housing opposite said non-perforate end closure, and wherein said entry port to said cyclone housing is the opening between the outer portion of said spirally disposed deflecting vane and an inner portion of a spirally disposed deflecting vane.

13. A muffler of claim 12 wherein said means for inducing cyclonic circulation comprises dual opposed deflecting vanes spirally disposed about the axis of said cyclone housing and located at the end of said housing opposite said non-perforate end closure, and wherein said entry port to said cyclone housing is the opening between the outer portion of one of said spirally disposed deflecting vanes and an inner portion of the other spirally disposed deflecting vane.

14. A muffler adapted for use in the exhaust system of an internal combustion engine, said muffler comprising
A. a muffler body having a muffler inlet and a muffler outlet,
B. a primary cyclone separator and a secondary cyclone separator positioned within said muffler body,
C. means for conducting exhaust gas within said muffler from said muffler inlet into said primary and said secondary cyclone separators, and
D. means for conducting purified exhaust gas within said muffler from said primary and said secondary cyclone separators out through said muffler outlet,
each of said primary and said secondary cyclone separators comprising a cyclone housing formed by a side wall and end closures, said housing having an entry port at one end, means for inducing cyclonic circulation of particulate-containing gas entering said cyclone housing through said entry port, an exit tube axially located within said cyclone housing and extending through the end closure nearest said entry port, the opposite end closure being non-perforate, said housing having a substantially circular cross section having throughout its length an inside diameter greater than the inside diameter of said exit tube and having an opening in said side wall in proximity to said non-perforate end closure, said opening connecting with a closed particulate collection chamber.

15. A muffler of claim 14 wherein said particulate collection chambers contain expanded metal.

16. A muffler of claim 14 wherein said cyclone housings are substantially cylindrical.

17. A muffler of claim 14 wherein said means for inducing cyclonic circulation comprises a deflecting vane spirally disposed about the axis of said cyclone housing and located at the end of said housing opposite said non-perforate end closure, and wherein said entry port to said cyclone housing is the opening between the outer portion of said spirally disposed deflecting vane and an inner portion of a spirally disposed deflecting vane.

18. A muffler of claim 17 wherein said means for inducing cyclonic circulation comprises dual opposed deflecting vanes spirally disposed about the axis of said cyclone housing and located at the end of said housing opposite said non-perforate end closure, and wherein said entry port to said cyclone housing is the opening between the outer portion of one of said spirally disposed deflecting vanes and an inner portion of the other spirally disposed deflecting vane.

19. A muffler of claim 18 wherein said means for conducting exhaust gas within said muffler into said primary cyclone separator comprises an exhaust conduit forming an exhaust flow path from said muffler inlet to said entry port of said primary cyclone separator, said exhaust conduit having an opening in its wall, said opening communicating with said means for conducting exhaust gas within said muffler into said secondary cyclone separator.

* * * * *